US008765847B2

(12) United States Patent
Moran et al.

(10) Patent No.: US 8,765,847 B2
(45) Date of Patent: Jul. 1, 2014

(54) ASPHALT COMPOSITIONS WITH CRACKING RESISTANCE ADDITIVES

(71) Applicant: ExxonMobil Research and Engineering Company, Annandale, NJ (US)

(72) Inventors: Lyle Edwin Moran, Sarnia (CA); Laura Frances McKibben, Sarnia (CA)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/674,461

(22) Filed: Nov. 12, 2012

(65) Prior Publication Data

US 2014/0135431 A1     May 15, 2014

(51) Int. Cl.
*C08L 95/00*     (2006.01)

(52) U.S. Cl.
USPC .......................................................... 524/68

(58) Field of Classification Search
USPC .......................................................... 524/68
See application file for complete search history.

(56) References Cited

U.S. PATENT DOCUMENTS

| | | | |
|---|---|---|---|
| 5,002,987 A | 3/1991 | Schulz | |
| 5,328,943 A * | 7/1994 | Isobe et al. | 524/70 |
| 5,904,760 A | 5/1999 | Hayner | |
| 6,136,899 A | 10/2000 | Lewandowski et al. | |
| 2003/0171460 A1 | 9/2003 | Rached et al. | |
| 2006/0011101 A1 | 1/2006 | Gale et al. | |

FOREIGN PATENT DOCUMENTS

| | | |
|---|---|---|
| CN | 1519277 A | 8/2004 |
| CN | 101608069 | 12/2009 |
| EP | 0885935 A1 | 12/1998 |
| JP | 3074464 A | 3/1991 |
| WO | 0055257 A1 | 9/2000 |

OTHER PUBLICATIONS

Yufeng Cong, Kejian Liao, Wei Huang and Yuchun Zhai, Performance of SBR-Modified Asphalt, Petroleum Science and Technology, 2006, vol. 24, No. 10, pp. 1187-1194.
Asphalt Paving Technology (1993), 62, 1-22 CODEN: APATDV; ISSN: 0270-2932.
Proceedings of the Annual Conference of Canadian Technical Asphalt Association (1983), 28th, 376-84 CODEN: PACADA; ISSN: 0712-2470.
Shiyou Lianzhi and Yu Huagong, "A Study on Pavement Performance of an Asphalt Modified with SBR", (1999), 30(10), 9-11 CODEN: SLYHEE; ISSN: 1005-2399.
Xiangjiao Gongye (2000), 47(6), 353-355 CODEN: XIGOED; ISSN: 1000-890X.
PCT Application No. PCT/US2013/062113, Communication from the International Searching Authority, Form PCT/ISA/220, dated Dec. 9, 2013, 5 pages.

* cited by examiner

*Primary Examiner* — Peter Szekely
(74) *Attorney, Agent, or Firm* — Robert A. Migliorini (57) ABSTRACT

Methods are provided for upgrading the quality of an asphalt. The methods include mixing an asphalt feed with a cracking resistance additive that improves the low temperature properties of the asphalt while leaving the high temperature properties unchanged or minimally changed. The cracking resistance additive corresponds to a compound that is a liquid at both the low temperature performance grade for the asphalt and at mixing and/or storage temperature for the asphalt. Examples of compounds that, in an appropriate molecular weight range, are liquids across this broad temperature range include polyalphaolefins, alkylated naphthalenes, and organic esters.

19 Claims, 2 Drawing Sheets

ASPHALT COMPOSITIONS WITH CRACKING RESISTANCE ADDITIVES

FIELD

This disclosure provides improved asphalt compositions and methods for making such asphalt compositions.

BACKGROUND

Asphalt is one of the world's oldest engineering materials, having been used since the beginning of civilization. Asphalt is a strong, versatile and chemical-resistant binding material that adapts itself to a variety of uses. For example, asphalt is used to bind crushed stone and gravel into firm tough surfaces for roads, streets, and airport runways. Asphalt, also known as pitch, can be obtained from either natural deposits, or as a by-product of the petroleum industry. Natural asphalts were extensively used until the early 1900s. The discovery of refining asphalt from crude petroleum and the increasing popularity of the automobile served to greatly expand the asphalt industry. Modern petroleum asphalt has the same durable qualities as naturally occurring asphalt, with the added advantage of being refined to a uniform condition substantially free of organic and mineral impurities.

Most of the petroleum asphalt produced today is used for road surfacing. Asphalt is also used for expansion joints and patches on concrete roads, as well as for airport runways, tennis courts, playgrounds, and floors in buildings. Another major use of asphalt is in asphalt shingles and roll-roofing which is typically comprised of felt saturated with asphalt. The asphalt helps to preserve and waterproof the roofing material. Other applications for asphalt include waterproofing tunnels, bridges, dams and reservoirs, rust-proofing and sound-proofing metal pipes and automotive under-bodies; and sound-proofing walls and ceilings.

The raw material used in modern asphalt manufacturing is petroleum, which is naturally occurring liquid bitumen. Asphalt is a natural constituent of petroleum, and there are crude oils that are almost entirely asphalt. The crude petroleum is separated into its various fractions through a distillation process. After separation, these fractions are further refined into other products such as asphalt, paraffin, gasoline, naphtha, lubricating oil, kerosene and diesel oil. Since asphalt is the base or heavy constituent of crude petroleum, it does not evaporate or boil off during the distillation process. Asphalt is essentially the heavy residue of the oil refining process.

Published European Patent Application Publication EP 0885935 describes polymer modified asphalt-diluent binder compositions. The compositions are described as having enhanced low temperature service performance. The compositions include asphalt, a polymer such as ethyl vinyl acetate or styrene-butadiene rubber to provide better rutting resistance, and a diluent oil such as paraffinic oil, motor oil (including used or reprocessed motor oils), or industrial oil to improve low temperature properties. The diluent oil can have a viscosity of from 100 to 250,000 cSt at 40° C. The amount of diluent oil can be from 1-50 wt % of the asphalt composition, with amounts greater than 10% being not uncommon. The amount of polymer can be from 1-6 wt %. The examples show that addition of the diluent oil improves the low temperature properties but also reduces the high temperature performance grade of asphalt compositions.

SUMMARY

In an embodiment, an asphalt composition is provided, comprising: an asphalt having a T10 boiling point of at least 900° F. (482° C.); and from 0.25 wt % to 2.0 wt % of a cracking resistance additive, the cracking resistance additive comprising at least one of a polyalphaolefin, an alkylated aromatic based on an aromatic having two or more fused aromatic rings and an average alkyl chain length of at least 10 carbons, and an organic ester, the boiling point of the cracking resistance additive being at least 140° C.

In another embodiment, a method for forming an asphalt composition is provided, comprising: mixing an asphalt with 0.1 wt % to 5 wt % of cracking resistance additive, the cracking resistance additive comprising at least one of a polyalphaolefin, an alkylated aromatic based on an aromatic having two or more fused aromatic rings and an average alkyl chain length of at least 10 carbons, and an organic ester, the boiling point of the cracking resistance additive being at least 140° C.

In still another embodiment, a method for forming an asphalt composition is provided, comprising: fractionating a feedstock containing at least a portion derived from a mineral crude oil at a cut point of at least 900° F. (510° C.) to form a lower boiling fraction and an asphalt fraction; and mixing the asphalt fraction during fractionation with at least one of a polymer additive and a cracking resistance additive to form an asphalt composition.

DETAILED DESCRIPTION

All numerical values within the detailed description and the claims herein are modified by "about" or "approximately" the indicated value, and take into account experimental error and variations that would be expected by a person having ordinary skill in the art.

Overview

In various aspects, methods are provided for upgrading the quality of an asphalt. The methods include mixing an asphalt feed with a cracking resistance additive that improves the low temperature properties of the asphalt while leaving the high temperature properties unchanged or minimally changed. The cracking resistance additive corresponds to a compound that is a liquid at both the low temperature performance grade for the asphalt and at mixing and/or storage temperature for the asphalt. Examples of compounds that, in an appropriate molecular weight range, are liquids across this broad temperature range include polyalphaolefins, alkylated naphthalenes, and organic esters. For compounds that are liquids across this broad temperature range, amounts of 2 wt % or less of the additive are effective for improving the low temperature performance grade of the asphalt. As a result, the amount of dilution of the asphalt at the high temperature performance grade is small, resulting in minimal changes in the high temperature grade. The resulting combination of an asphalt feed and a cracking resistance additive corresponds to an improved asphalt composition.

One way of characterizing the properties of an asphalt (or corresponding asphalt feed) is to consider the performance of the asphalt or asphalt feed in three temperature ranges. A first temperature range corresponds to storage, mixing, and compacting temperatures for the asphalt. This is the highest temperature range of the three temperature ranges. This is the temperature range that corresponds to a fluid state for the asphalt that allows the asphalt to be applied to a surface. The storage and mixing temperatures for an asphalt are also in this range, so that the asphalt can remain in a fluid, well-mixed state prior to use. The low temperature end point for the first temperature range is related to the temperature required to maintain the asphalt in a sufficiently fluid state during storage and mixing. As a result, additives that can lower the viscosity of an asphalt in this temperature range may be desirable, as such additives can lower the temperature of the first temperature range for a given asphalt.

The cracking resistance additives described herein will tend to reduce the mixing and/or storage temperature of an asphalt, as the viscosity of the cracking resistance additives will tend to be lower than the viscosity of the asphalt at the mixing or storage temperature. However, due to the low weight percentage of cracking resistance additive that is needed to achieve a desired improvement in low temperature properties, the amount of reduction in mixing and/or storage temperature for an asphalt may be minimal.

A second temperature range for an asphalt corresponds roughly to the high temperature end of the performance range for the asphalt. For a given asphalt application, the asphalt can have low and high boundary temperatures that roughly describe the effective operating range for the asphalt. The SUPERPAVE™ temperature grade is an example of one method for specifying the low and high temperature operating boundaries for a paving asphalt. In this second temperature range corresponding to the high temperature end of the performance range, the typical problem for an asphalt is softening due to the asphalt approaching a glass transition and/or liquid transition temperature, resulting in undesirable flow of the asphalt. Thus, additives that tend to increase the solid or crystalline character of an asphalt may be desirable in this temperature range. Alternatively, additives that do not substantially impact the high temperature performance of the asphalt while improving other properties can also be desirable.

The cracking resistance additives described herein typically do not improve the high temperature performance grade of an asphalt. However, the cracking resistance additives also typically do not degrade the high temperature performance. Instead, the high temperature performance grade for an asphalt mixed with cracking resistance additive is typically the same as the high temperature performance grade for the asphalt alone, or 1° C. or less different from the high temperature performance grade for the asphalt alone, or 2° C. or less different from the high temperature performance grade for the asphalt alone.

A third temperature range for an asphalt corresponds roughly to the low temperature end of the performance range for the asphalt. In this third temperature range, the asphalt is clearly in a solid-type phase, so there is little concern the asphalt being too soft. Instead, in this temperature range the typical concerns relate to the asphalt becoming brittle and/or cracking due to temperature swings. Due to the variety of components present in asphalt, differential expansion of some portions of an asphalt relative to other portions is possible, leading to cracks or fractures as temperature changes. Additionally, phase interfaces, particle, and/or other interfaces within an asphalt may contribute to brittleness of the asphalt. As a result, an asphalt with a lower amount of crystalline character may be beneficial, to reduce the number of solid-solid boundaries and the potential for differential temperature expansion.

The cracking resistance additives described herein are still liquids at low performance grade temperature for the asphalt. As a result, the cracking resistance additives help to reduce the stiffness of the asphalt, resulting in a lower temperature for the low temperature performance grade of the asphalt/additive mixture.

One potential application for upgrading an asphalt with a cracking resistance additive is to improve the overall yield of desirable products from a crude oil feed. An asphalt is a residual fraction formed after distillation. Increasing the distillation cut point for an asphalt generally results in a harder asphalt (higher temperature for high temperature performance grade) that also has less favorable low temperature qualities (higher temperature for low temperature performance grade). Increasing the distillation cut point also results in an increase in the amount of vacuum gas oil generated from a feed at the expense of the amount of asphalt. This is often a favorable trade, as vacuum gas oil is a higher value fraction than an asphalt fraction. Using a cracking resistance additive, a higher distillation cut point can be used for forming an asphalt fraction from a feed while still achieving a desired temperature for the low temperature performance grade of the asphalt.

Asphalt Feedstocks

Some feedstocks in accordance with the present disclosure are heavy oils that include at least a portion of asphaltenes. Such heavy oils are suitable, possibly after additional distillation, for making an asphalt. Asphalt is a viscoelastic semi-solid bituminous material derived from the distillation residue of crude petroleum. Asphalt may be obtained from a variety of heavy oil sources including straight run vacuum residue, mixtures of vacuum residue with diluents such as vacuum tower wash oil, paraffin distillate, aromatic and naphthenic oils and mixtures thereof, oxidized vacuum residues or oxidized mixtures of vacuum residues and diluent oils and the like. Because it is hydrophobic and has good adhesive and weathering characteristics, asphalt is widely used as a binder or cement for stone or rock aggregate in pavement construction (typically only 5 wt % of the mixture). Other feedstocks suitable for use in the disclosure include whole or reduced petroleum crude oils, atmospheric residua feedstocks, and vacuum residua feedstocks.

One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point for a feed is defined as the temperature at which 5 wt % of the feed will boil. Similarly, a "T95" boiling is defined as the temperature at which 95 wt % of the feed will boil.

A typical feedstock for forming asphalt can have a normal atmospheric boiling point of at least 350° C., more typically at least 400° C., and will have a penetration range from 20 to 500 dmm at 25° C. (ASTM D-5). Alternatively, a feed may be characterized using a T5 boiling point, such as a feed with a T5 boiling point of at least 350° C., or at least 400° C., or at least 440° C.

Another example of a feedstock suitable for forming asphalt is a feedstock derived from an atmospheric resid fraction or a similar petroleum fraction. For example, when a whole crude oil, partial crude oil, or other feedstock is processed in a refinery, one common type of processing is to distill or fractionate the crude oil based on boiling point. One type of fractionation is atmospheric distillation, which can result in one or more fractions that boil at less than 650° F. (343° C.) or less than 700° F. (371° C.), and a bottoms fraction. This bottoms fraction corresponds to an atmospheric resid.

The bottoms fraction from atmospheric distillation can then be separated or fractionated using vacuum distillation. This generates one or more vacuum gas oil fractions and a vacuum resid fraction. The vacuum resid fraction may be suitable for use as an asphalt. The distillation cut point for forming the vacuum bottoms fraction can be selected based on a desired amount of vacuum gas oil and/or a desired quality for the asphalt fraction. Selecting a higher temperature cut point can increase the amount of a vacuum gas oil. However, such a higher temperature cut point will typically reduce the quality of the corresponding asphalt. Since both vacuum gas oil yield and asphalt quality are also dependent on the nature of the feedstock, the temperature cut point to achieve a desired combination of vacuum gas oil yield and asphalt quality will vary. A suitable cut point for the vacuum bottoms fraction to achieve a desired asphalt quality and/or to achieve a desired vacuum gas oil yield can be at least 950° F. (510° C.), such as at least 1000° F. (538° C.) or at least 1050° F. (566° C.). Because adding wax and a pour point depressant can improve the properties of an asphalt feed, lower quality asphalts can be improved to allow for higher value uses. Thus, asphalts derived based on a cut point of at least 1100° F. (593° C.) or at least 1150° F. (621° C.) may also be suitable. This can allow for a further increase in the amount of vacuum gas oil derived from a given feedstock. Additionally or alternately, vacuum bottoms fractions can be formed with T5 or T10 boiling points corresponding to any of the cut point temperatures mentioned above, such as vacuum bottoms fractions with a T5 or T10 boiling point of at least 950° F., or at least 1000° F., or at least 1050° F., or 1150° F. or less, or 1100° F. or less.

Asphalt and Cracking Resistance Additives

In various aspects, a cracking resistance additive can be added to an asphalt feed in order to improve the low temperature properties of the asphalt. The cracking resistance additive is preferably a liquid or close to the melting at the low temperature performance grade for the additive. The cracking resistance additive is preferably also a liquid at the mixing or storage temperature for the asphalt.

One type of compound that is suitable for use as a cracking resistance additive is polyalphaolefins. Polyalphaolefins are polymers made by polymerizing alpha olefin monomer units. This results in a polymer with numerous side chains. The side chains are believed to inhibit crystal formation, and thus allow polyalphaolefins to remain as liquids at temperatures that are lower than expected relative to the molecular weight and composition of the polymers. Suitable polyalphaolefins for use as cracking resistance additives can have a melting point below the low temperature performance grade of the asphalt, such as a melting point at least 5° C. less or at least 10° C. less than the low temperature performance grade of the asphalt. Additionally or alternately, suitable polyalphaolefins can have a pour point below the low temperature performance grade of the asphalt, such as a pour point at least 5° C. less or at least 10° C. less than the low temperature performance grade of the asphalt. Suitable polyalphaolefins can also have a boiling point that is greater than the mixing and/or storage temperature for an asphalt, such as at least 140° C. or at least 160° C. or at least 175° C.

Another type of compound that is suitable for use as a cracking resistance additive is an alkylated aromatic, such as an alkylated naphthalene, alkylated anthracene, or another type of molecule containing an aromatic core and an alkyl side chain. Alkylated aromatics, such as alkylated naphthalenes, can be manufactured by catalytic alkylation of linear alphaolefins to naphthalene or another aromatic. Because of the mixture of a bulky aromatic group with a paraffinic tail, alkylated naphthalenes and other alkylated aromatics are believed to not readily organize into crystal structures. Preferably, an alkylated aromatic suitable for use as a cracking resistance additive is an alkylated aromatic or mixture of alkylated aromatics with an average alkyl chain length of at least 10 carbons, such as at least 14 carbons, preferably at least 18 carbons, such as at least 24 carbons or at least 30 carbons. Preferably, the an alkylated aromatic suitable for use as a cracking resistance additive is an alkylated aromatic or mixture of alkylated aromatics containing fused aromatic ring structures of two or more aromatic rings. Naphthalene and anthracene are examples of fused aromatic ring structures containing two or more aromatic rings. In some aspects, an alkylated aromatic can be an alkylated naphthalene or a mixture of alkylated naphthalenes. Alternatively, the alkylated aromatics can be one or more alkylated naphthalenes, one or more alkylated anthracenes, one or more other types of alkylated aromatics, or a mixture thereof. In some aspects, the alkylated aromatic or mixture of alkylated aromatics can include aromatic rings that include only carbon atoms, and therefore the aromatic rings do not include heteroatoms such as nitrogen, oxygen, or sulfur.

Suitable alkylated aromatics for use as cracking resistance additives can have a melting point below the low temperature performance grade of the asphalt, such as a melting point at least 5° C. less or at least 10° C. less than the low temperature performance grade of the asphalt. Additionally or alternately, suitable alkylated aromatics can have a pour point below the low temperature performance grade of the asphalt, such as a pour point at least 5° C. less or at least 10° C. less than the low temperature performance grade of the asphalt. Suitable alkylated aromatics can also have a boiling point that is greater than the mixing and/or storage temperature for an asphalt, such as at least 140° C. or at least 160° C. or at least 175° C.

Still another option for a cracking resistance additive is an organic ester. Suitable organic esters for use as cracking resistance additives can have a melting point below the low temperature performance grade of the asphalt, such as a melting point at least 5° C. less or at least 10° C. less than the low temperature performance grade of the asphalt. Additionally or alternately, suitable organic esters can have a pour point below the low temperature performance grade of the asphalt, such as a pour point at least 5° C. less or at least 10° C. less than the low temperature performance grade of the asphalt. Suitable organic esters can also have a boiling point that is greater than the mixing and/or storage temperature for an asphalt, such as at least 140° C. or at least 160° C. or at least 175° C.

Yet another option is to use a cracking resistance additive that includes one or more polyalphaolefins, and/or one or more alkylated aromatics such as one or more alkylated naphthalenes, and/or one or more organic esters. Preferably, for cracking resistance additives containing mixtures of additive classes, such as mixtures of polyalphaolefins and alkylated aromatics; or polyalphaolefins and organic esters; or alkylated aromatics and organic esters; or polyalphaolefins and alkylated aromatics and organic esters, each class of compounds can separately satisfy the melting point and boiling point properties mentioned above.

In various aspects, the amount of cracking resistance additive added to an asphalt can be 5 wt % or less of the asphalt, such as 3 wt % or less, and preferably 2.5 wt % or less or 2.0 wt % or less. The amount of cracking resistance additive can be at least 0.1 wt % of the asphalt, such as at least 0.25 wt %, and preferably at least 0.5 wt % or at least 0.75 wt %.

Styrene Butadiene Additives

In some aspects, other types of compounds can be used as asphalt additives in order to modify the performance properties of an asphalt. Styrene butadiene copolymers are another example of an additive that can improve the low temperature performance of an asphalt. Addition of low molecular weight styrene butadiene copolymer to asphalt improves the low temperature performance of the asphalt, thus enhancing the SUPERPAVE™ performance curve of the asphalt. Styrene butadiene is also known as Buna S or GR-S (Government Rubber-Styrene) which was used as the synthetic substitute for natural rubber during World War II. Suitable styrene butadiene copolymers are viscous liquids that can be easily blended with asphalt, such as by blending the copolymer with asphalt using low shear mixing. It is noted that the styrene butadiene copolymers should not be block copolymers, as such block copolymers have higher melting points.

Suitable styrene butadiene copolymers include copolymers having a molecular weight from 1000 to 10,000 g/mol, and a ratio of styrene monomers to butadiene monomers from 1:5 to 5:1. The amount of styrene butadiene copolymer added to an asphalt can be 1 wt % to 6 wt %, such as at least 1.5 wt % to 4 wt % or less. The viscosity at 25° C. for the styrene butadiene copolymer can be from 10,000 cps to 100,000 cps. Addition of the styrene butadiene copolymer allows for reduction of the low temperature performance grade for an asphalt of at least 1.5° C. while causing a reduction in the high temperature performance grade by 1° C. or less. Unexpectedly, this benefit in the low temperature performance grade is achieved without having to perform crosslinking on the added copolymer.

In some preferred embodiments, the percentage of 1-2 vinyl linkages in the styrene butadiene copolymer is 75% or less, such as 60% or less, and preferably 50% or less. Preferably, the percentage of 1-2 vinyl linkages is at least 10%, such as at least 20%. The glass transition temperature of the styrene butadiene copolymer can be −10° C. or less. In some preferred embodiments, the glass transition temperature of the styrene butadiene copolymer is −25° C. or less, such as −40° C. or less or −50° C. or less.

In addition to using single additives, combinations of a styrene butadiene copolymer with one or more cracking resistance additives can be formed. The cracking resistance additive(s) and styrene butadiene copolymer additive can each be added in the amounts indicated above.

Phase Partitioning in Polymer Modified Asphalts

One of the difficulties for incorporating a polymer such as styrene butadiene into an asphalt is dispersing the polymer in the asphalt. When properly dispersed, blends of various types of polymer in asphalt (polymer modified asphalts) can have superior properties. However it is sometimes difficult to keep the polymer dispersed in the asphalt. At storage temperatures, many otherwise desirable polymers tend to phase separate from the asphalt, leaving separate polymer-rich and polymer-depleted (and typically asphaltene-rich) layers.

Conceptually, separation of a polymer modified asphalt into polymer-rich and polymer-poor phases can result from two types of phase separation phenomena. One type of phase separation is thermodynamic or microscopic phase separation. If a mixture of asphalt and polymer is at a temperature and pressure that results in phase separation, some type of phase separation will likely occur. However, the fact that phase separation is thermodynamically favored does not mean that macroscopic phase separation has occurred. A microscopic separation, such as droplets of one phase suspended in a second liquid phase, can also satisfy the thermodynamic requirement for phase separation. To achieve bulk, macroscopic phase separation, some type of agglomeration of the microscopic phase separation needs to occur. In this type of conceptual framework, if there is no microscopic phase separation, then there can be no corresponding macroscopic phase separation. Alternatively, even if a microscopic phase separation occurs, if the size of the droplets of the second phase are sufficiently small, they will also not macroscopically phase separate.

Based on the above, one way to avoid phase separation in a region of phase space where separation is thermodynamically favored is to prevent kinetic agglomeration of droplets. One method for avoiding such kinetic agglomeration is to have the mixture of polymer and asphalt start in a region of phase space where separation is not thermodynamically favored. The mixture can then be cooled from the single-phase region to a two-phase region. Without being bound by any particular theory, it is believed that the droplet size created by cooling down from the single-phase region of the phase diagram will be much smaller than the droplets which are obtained by mechanically mixing two phases under conditions where two phases are thermodynamically favored.

One option for mixing a polymer with an asphalt in a region of phase space where a single phase is thermodynamically favored is to mix a polymer with asphalt at a higher temperature. For example, the temperature for fractionating a resid feed suitable for forming an asphalt in a pipestill is typically greater than the storage temperature for an asphalt. Thus, mixing a polymer with the asphalt while the asphalt is still in the pipestill is more likely to result in mixing polymer with asphalt in a single phase region of phase space. Alternatively, a polymer composition for mixing with an asphalt can be selected to have a thermodynamic miscibility temperature at or below the storage temperature, so that the mixture of polymer and asphalt will be in the single phase region when initially mixed. In either situation, by mixing the polymer and asphalt at a temperature where the mixture is initially in a single phase region of phase space and then cooling the mixture later, the polymer and asphalt will only phase separate when the mixture is cooling down. This will facilitate good mixing to form a single phase when the polymer and asphalt are first combined. As the mixture cools, the increased viscosity as the mixture cools can assist with reducing or minimizing the amount of kinetic agglomeration that occurs, thus reducing or eliminating the formation of a macroscopic separate phase. This is in contrast to what occurs when a polymer and asphalt are mixed at a temperature below the single phase region, so that thermodynamic separation is favored. In such a region of phase space, physical mixing and shearing can reduce the size of macroscopic phases. However, separate phases larger than droplet size are likely to remain. As the asphalt is cooled, it is believed that these larger separate phases will gravitationally separate to form larger macroscopic phases.

EXAMPLES

One way of characterizing an asphalt composition is by using SUPERPAVE™ criteria. SUPERPAVE™ criteria (as described in the June 1996 edition of the AASHTO Provisional Standards Book and 2003 revised version) can be used to define the Maximum and Minimum Pavement service temperature conditions under which the binder must perform. SUPERPAVE™ is a trademark of the Strategic Highway Research Program (SHRP) and is the term used for new binder specifications as per AASHTO MP-1 standard. Maximum Pavement Temperature (or "application" or "service" temperature) is the temperature at which the asphalt binder will resist rutting (also called Rutting Temperature). Minimum Pavement Temperature is the temperature at which the binder will resist cracking. Low temperature properties of asphalt binders were measured by Bending Beam Rheometer (BBR). According to SUPERPAVE™ criteria, the temperature at which a maximum creep stiffness (S) of 300 MPa at 60 s loading time is reached, is the Limiting Stiffness Temperature (LST). Minimum Pavement Temperature at which the binder will resist cracking (also called Cracking Temperature) is equal to LST-10° C.

The SUPERPAVE™ binder specifications for asphalt paving binder performance establishes the high temperature and low temperature stiffness properties of an asphalt. The nomenclature is PG XX-YY which stands for Performance Grade at high temperatures (HT), XX, and at low temperatures (LT), -YY degrees C., wherein -YY means a temperature of minus YY degrees C. Asphalt must resist high summer temperature deformation at temperatures of XX degrees C. and low winter temperature cracking at temperatures of -YY degrees C. An example popular grade in Canada is PG 58-28. Each grade of higher or lower temperature differs by 6° C. in both HT and LT. This was established because the stiffness of asphalt doubles every 6° C. One can plot the performance of asphalt on a SUPERPAVE™ matrix grid. The vertical axis represents increasing high PG temperature stiffness and the horizontal axis represents decreasing low temperature stiffness towards the left. Each grid box represents a 6° C. by 6° C. box indicating the performance grade of an asphalt. Asphalt binders from a particular crude pass the SUPERPAVE™ specification criteria if they fall within the PG box through which the curves pass. Directionally poorer asphalt performance is to the lower right. Target exceptional asphalt or enhanced, modified asphalt performance is to the upper left, most preferably in both the HT and LT performance directions.

Although asphalt falls within a PG box that allows it to be considered as meeting a given PG grade, the asphalt may not be robust enough in terms of statistical quality control to guarantee the PG quality due to variation in the PG tests. This type of property variation is recognized by the asphalt industry as being as high at approximately +/-3° C. Thus, if an asphalt producer wants to consistently manufacture a given grade of asphalt, such PG 64-28, the asphalt producer must ensure that the PG tests well within the box and not in the right lower corner of the box. Any treatment which moves the curve out of the lower right corner even if only in the HT direction is deemed to result in the production of a higher quality asphalt, even if nominally in the same grade.

Example 1

Cracking Resistance Additives

Figure 1:
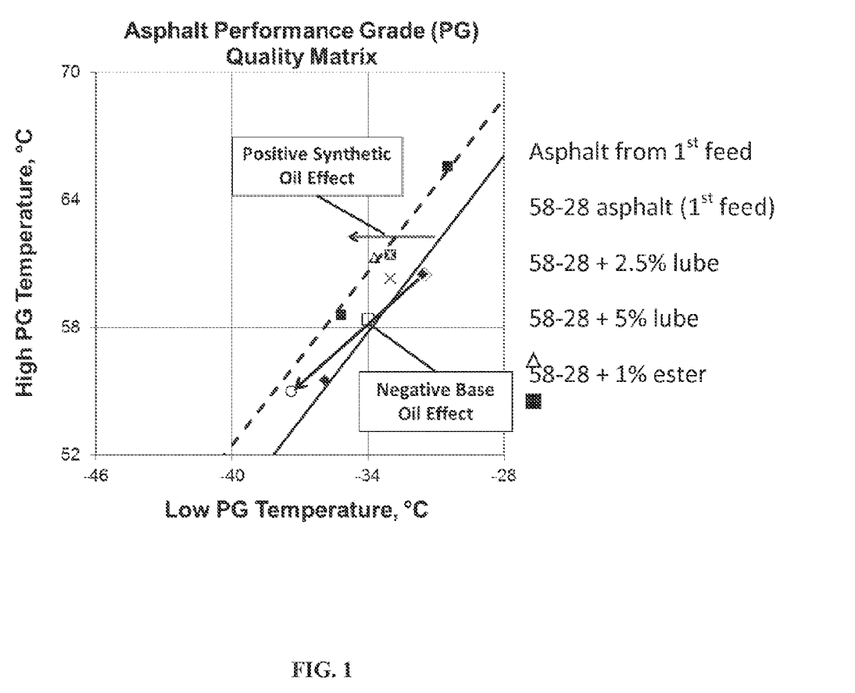
FIG. 1 shows properties of various asphalt compositions.

FIG. 1 shows an example of the benefits of using a cracking resistance additive in an asphalt composition. The benefits of using a cracking resistance additive are shown in comparison to using a conventional lubricating base oil as an additive.

FIG. 1 shows a SUPERPAVE™ matrix grid for asphalt properties for a variety of asphalt compositions. Curve 1 corresponding to the filled diamonds represents the types of asphalts that can be made by using various cut points for forming vacuum resids (asphalt feeds) from a first crude source. The data point corresponding to the open diamond is an example of a PG 58-28 asphalt formed from the first feed. Curve 2 corresponding to the filled squares represents asphalts that can be made from a second feed that normally produces more favorable asphalts. As can be seen in FIG. 1, asphalts made from the first feed at a given high temperature performance grade typically have a low temperature performance grade that is 2.5° C. higher than an asphalt formed from the second feed at the same high temperature performance grade.

Various additives can be used to attempt to improve the properties of an asphalt based on the first feed so that the additive-modified asphalt falls on the curve corresponding to the second feed. The advantage of using a cracking resistance additive is that the additive largely moves the properties of an asphalt to the left with little or no vertical movement. This corresponds to a decrease in low temperature performance grade while leaving the high temperature performance grade unchanged. By contrast, typical additives for improving low temperature performance, such as lubricating base oils, cause a base asphalt feed at a first high performance grade temperature to be shifted left, but with a corresponding change to a second lower high performance grade temperature. This means that at constant yield of asphalt, a typical additive results in a lower quality asphalt than an asphalt formed using a cracking resistance additive.

In FIG. 1, the open circle corresponds to addition of 5 wt % of a lubricant base oil to 58-28 base asphalt formed from the first feedstock. As indicated by the arrow, addition of 5 wt % of the lubricant base oil was effective for achieving an asphalt on the second asphalt curve, but there is a roughly 1 to 1 correspondence between the amount of reduction in low temperature performance grade and high temperature performance grade. As indicated by the open square, adding 2.5 wt % of the same lubricant base oil resulted in half as much change in each of the low temperature and high temperature performance grade.

By contrast, addition of either 1 wt % of a polyalphaolefin (open triangle) or 1 wt % of an alkylated naphthalene (white asterisk on black background) resulted in a 2.0° C.-2.5° C. reduction in the low temperature performance grade with little or no corresponding change in the high temperature performance grade. Thus, cracking resistance additives corresponding to polyalphaolefins and/or alkylated aromatics provide low temperature benefits with minimal or no degradation of high temperature performance. With regard to organic esters, FIG. 1 shows that addition of 1 wt % of an organic ester (marked as an "x" in FIG. 1) resulted in a 2.0° C. reduction in low temperature performance grade, but the high temperature performance grade also dropped by 1.0° C. Thus, organic ester cracking resistance additives are also effective in comparison to a conventional additive such as a lubricant base oil, but organic esters are not as effective as polyalphaolefin or alkylated naphthalene cracking resistance additives.

Example 2

Styrene Butadiene Copolymer Additive

Figure 2:
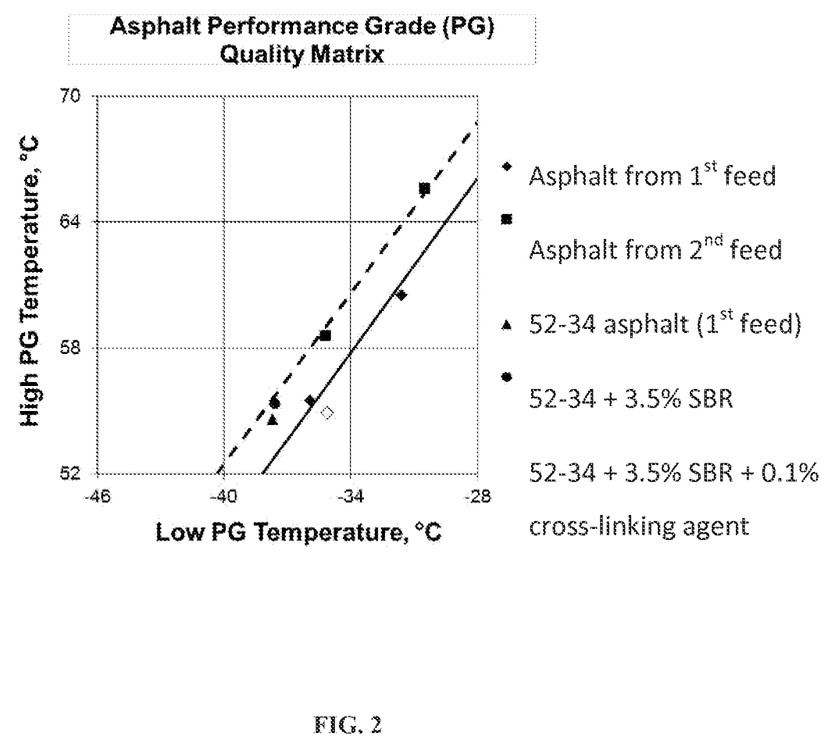
FIG. 2 shows properties of various asphalt compositions.

FIG. 2 shows an example of using styrene butadiene copolymer as an additive in an asphalt composition. FIG. 2 once again shows the curves for forming asphalts from the first feed (filled diamonds, solid line) and the second feed (filled squares, dotted line), and the 2.5° C. difference in the low temperature properties in asphalts formed from the two feeds at a given high performance temperature grade. In FIG. 2, the open diamond shows an example of a 52-34 base asphalt formed from the first feed. The filled triangle and filled circle show examples of polymer modified asphalts formed using the 52-34 base asphalt corresponding to the open diamond. As shown in FIG. 2, addition of 3.5 wt % of styrene butadiene copolymer (filled triangle) resulted in a 2.5° C. improvement in the low temperature performance grade, while causing little or no change in high temperature performance grade. Addition of 3.5 wt % of styrene butadiene copolymer with an additional 0.1 wt % of a crosslinking agent (filled circle) resulted in roughly the same low temperature and high temperature properties. It is noted that the cracking resistance additives described above achieved an effect similar to the addition of the 3.5 wt % of styrene butadiene copolymer while only requiring addition of 1 wt % of the cracking resistance additive.

The styrene butadiene copolymer used in Example 2 corresponded to a Ricon® 184 copolymer with a glass transition temperature of −57° C., a viscosity at 25° C. of 75,000 cps, 20-40% of 1-2 vinyl linkages, an average molecular weight of 8600, and a styrene weight percentage of 17-27%.

Example 3

Thermodynamic and Kinetic Phase Separation

In order to study phase separation for polymer modified asphalts, bulk mixtures of a polymer (ethyl vinyl acetate or low-density polyethylene)) and asphalt were made in a graduated cylinder. Ultraviolet (UV) light was then used to detect physical partitioning. A sand bath was used to heat the mixture and a direct drive stirrer was used to mix the mixture. After mixing, the cylinder was placed in a vacuum oven to gravitationally partition the phases. The polymer was introduced by grinding polymer pellets into a coarse powder (through 1 mm mesh), which allowed the dispersal of the polymer in the asphalt under the mixing conditions.

UV light was selected as a probe based on the relative fluorescent properties of ethyl vinyl acetate (EVA) polymer and the base asphalt or resid. EVA polymer strongly fluoresces, so an EVA-containing phase is brighter than an EVA-poor phase. The resid itself contains molecules that fluoresce, such as asphaltenes, but the asphaltenes also tend to absorb light. Fluorescence was not observed for aliphatic material, including non-functionalized polyolefins such as low-density polyethylene. Thus, when phase separation was accomplished using the EVA, the low-density polymer-rich phase was brighter than the darker asphaltenic phase. When phase separation was accomplished using a low-density polyethylene, the low-density polymer-rich aliphatic phase was almost totally dark, while the asphaltene-containing phase fluoresced weakly.

The first mixture studied was a 975° F.+ vacuum resid from a first crude source and 5% weight of an EVA polymer (9.21% Vinyl-acetate, MW=48,400). It was stirred for an hour at ~160° C. and then placed in a vacuum oven at 160° C., first overnight and then over a weekend. Macroscopic phase separation was not observed. However, observation of the material under an optical microscope showed that there were indeed two phases present. At both 160° C. and also at the slightly higher temperature of 180° C., the mixture was too viscous to allow the polymer-rich and polymer-poor phase to macroscopically phase separate.

A similar experiment was performed with a 1004° F. reside from a second, waxier crude source. Once again, phase separation was observed by microscopy at both 160° C. and 180° C., but the viscosity at those temperatures was too high (relative to the density contrast between phases) to allow macroscopic phase segregation. At this time, we became aware that the vacuum resid in the Sarnia example had a lower cut-point (800° F.+) than the material which we used (975° F.+), and would therefore be less viscous at a comparable temperature.

The experiment was then repeated with an atmospheric resid (800° F.+) from the second waxier source. This sample also showed no macroscopic phase separation. Upon observing this mixture under the microscope, it was found that at 160° C. only one phase was present. Thus, even though the viscosity was lower than the viscosity of the mixtures formed using a vacuum resid, the mixture appeared to favor a single phase thermodynamically. The entropy of mixing afforded by the lower molecular weights in the atmospheric resid resulted in the single phase region being thermodynamically favored at lower temperatures. On cooling the sample in the microscope hot-stage, we found that phase separation of a polymer-rich phase occurred only near room temperature, where the viscosity was again higher.

Next, different mixtures of the atmospheric resid and vacuum resid from the second source were made. For a mixture containing 33% vacuum resid and 67% atmospheric resid with 5% EVA, phase separation occurred at a little above 100° C. This sample did macroscopically separate vertically when maintained at 100° C. overnight in a vacuum oven. The upper EVA rich phase appeared to be barely 20% of the volume, which was more than the volume of EVA, but not as swollen with saturates as we were aiming for.

Another tested mixture corresponded to 50% vacuum resid and 50% atmospheric resid with 5% EVA. For this mixture, phase separation occurred at 165° C. Two types of mixing experiments were performed on this asphalt composition. In one test, a mixture of 50% ALAR and 50% ALVR with 5% EVA, was mixed at temperatures above 200° C. This mixture that included mixing at above 200° C. did not macroscopically phase separate even when sitting at 140° C. for a week. In a second test, the same composition was mixed at mixing temperature which were kept at or below 140° C. This second test showed an upper liquid phase of ~20% after incubating for a few days at 140° C.

A third type of test included forming a similar mixture of 50% vacuum resid and 50% atmospheric resid with 5% of a high-MW low-density polyethylene (LDPE). In this LDPE mixture, the second phase was present at temperatures of at least 220° C. In part due to difficulties in controlling the temperature of the open sand bath, it was found that mixing was not sufficient at some lower temperatures and that large clumps of polymers were still present. The mixing temperature was therefore increased to as high as 220° C. in order to achieve suitable mixing.

Observation under a microscope providing additional information the test samples that were mixed at two different temperatures. The mixture of asphalt and 5 wt % EVA had an upper critical solution temperature. When the sample was cooled from the homogeneous single-phase regime below the bimodal phase boundary, the system nucleated the minority phase as many very small droplets. Even at the highest magnification used, these drops were too small to see clearly, and had sizes ≤1μ. Thus, when the polymer+resid (asphalt) mixture entered the two-phase regime by cooling from the single-phase regime, the initial droplet size was the critical nucleus size and the heterogeneous nucleation gave rise to numerous tiny droplets. If the material were quenched into the spinodal regime, then we might expect phase separation to occur through the process of spinodal decomposition, also setting an extremely short length-scale for the initial droplet size. The small droplet size resulting from the path through the single-phase regime makes it much more difficult for the system to macroscopically phase separate. The terminal velocity of a droplet of one phase in another will be proportional to the density contrast, inversely proportional to the viscosity of the continuous phase, and proportional to the square of the radius of the droplet.

$$v = \frac{2}{9} \frac{\Delta \rho g r^2}{\eta}$$

Even at elevated temperatures, the viscosities of an asphalt mixture are relatively high, with the viscosity of a potential asphaltene-rich saturate-depleted phase being particularly high. It is thus clear why droplets formed by nucleation of a second-phase in such a system are kinetically impeded from macroscopically phase-separating. In addition to the rising of the lighter phase, the droplets can get larger by diffusion and Ostwald ripening. This is also dependent on the diffusion of molecules in such a system, which will be very slow in such a resid.

The situation is different if the polymer is added as a macroscopic coarse powder and is mixed at a temperature where the system is thermodynamically a two-phase system. In such a situation, the 0.1 mm sized pieces of polymer swelled with the appropriate fraction of resid components in order to balance their chemical potentials, thus minimizing the free energy of the system. The size of the domains of the polymer-rich phase will then be at least the size of the polymer grains, and will become larger due to the swelling of the polymer phase by the resid components. In a sense, in such a situation the phase is "nucleated" by the polymer grains. Thus if the polymer is added in this way, there might be only hundreds of droplets in a given volume while in the case of nucleation from a single phase, there might be millions.

The shear due to stirring can break up the swollen polymer grains slightly, but it would have to be excessively vigorous to get the droplets to the small size typical of the nucleation case. Mixing is important achieving uniformity in mixtures in the single phase region, however, because if the polymer pieces are too large, the diffusion necessarily to approach equilibrium will not be sufficient.

Based on the above, it is believed to be important to characterize the polymer asphalt mixtures in terms of the temperature at which the polymer (at a given concentration) forms a single-phase solution with the asphalt. Aside from dependence on composition, it will also be found that the temperature will be lower for lower molecular weight polymers. To prevent macroscopic phase separation, it is only necessary for the mixture to experience a temperature above the phase separation point once. Thus, one only has to assure that the temperature of the mixture during blending, or just after blending, is sufficiently high. Even if the sample is cooled to a temperature below the phase boundary where two phases will form, the small size of the nucleated droplets will make it such that the polymer will not macroscopically phase separate.

Additional Embodiments and EP Clauses

1. An asphalt composition, comprising: an asphalt having a T10 boiling point of at least 900° F. (482° C.); and from 0.25 wt % to 2.0 wt % of a cracking resistance additive, the cracking resistance additive comprising at least one of a polyalphaolefin, an alkylated aromatic based on an aromatic having two or more fused aromatic rings and an average alkyl chain length of at least 10 carbons, and an organic ester, the boiling point of the cracking resistance additive being at least 140° C.

2. The asphalt composition of clause 1, wherein the cracking resistance additive comprises at least one of a polyalphaolefin and an alkylated aromatic based on an aromatic having two or more fused aromatic rings and an average alkyl chain length of at least 10 carbons.

3. The asphalt composition of clause 2, wherein the alkylated aromatic comprises an alkylated naphthalene.

4. The asphalt composition of any of the above clauses, wherein the average alkyl chain length is at least 14 carbons, such as at least 18 carbons, or at least 24 carbons, or at least 30 carbons.

5. The asphalt composition of any of the above clauses, wherein the cracking resistance additive has a pour point that is at least 5° C. less than a low temperature performance grade for the asphalt.

6. The asphalt composition of any of the above clauses, wherein the cracking resistance additive has a melting point that is at least 5° C. less than a low temperature performance grade for the asphalt.

7. The asphalt composition of any of the above clauses, further comprising from 1 wt % to 6 wt % of a styrene butadiene copolymer.

8. The asphalt composition of clause 7, wherein the styrene butadiene copolymer has a glass transition temperature of −50° C. or less and includes 40% or less of 1-2 vinyl linkages.

9. A method for forming an asphalt composition, comprising: mixing an asphalt with a) 0.1 wt % to 5 wt % of cracking resistance additive, the cracking resistance additive comprising at least one of a polyalphaolefin, an alkylated aromatic based on an aromatic having two or more fused aromatic rings and an average alkyl chain length of at least 10 carbons, and an organic ester, the boiling point of the cracking resistance additive being at least 140° C., b) 1 wt % to 6 wt % of styrene butadiene copolymer, or c) a combination thereof.

10. The method of clause 9, wherein the asphalt comprises an asphalt fraction formed by fractionating a feedstock containing at least a portion derived from a mineral crude oil at a cut point of at least 900° F. (482° C.) to form the asphalt fraction, such as at least 1100° F. (593° C.).

11. The method of clause 10, wherein mixing an asphalt comprises mixing the asphalt fraction during fractionation with at least one of a polymer additive and a cracking resistance additive to form an asphalt composition, the mixing of the asphalt fraction during fractionation optionally being performed prior to the asphalt fraction being removed from a fractionator.

12. The method of any of clauses 9-11, wherein mixing the asphalt comprises mixing the asphalt with the cracking resistance additive at a temperature where the cracking resistance additive and the asphalt form a single phase.

13. The method of any of clauses 9-12, wherein the styrene butadiene copolymer has a glass transition temperature of −50° C. or less and includes 40% or less of 1-2 vinyl linkages.

14. The method of any of clauses 9-13, wherein mixing an asphalt comprises mixing the asphalt fraction during fractionation with at least one of a polymer additive and a cracking resistance additive to form an asphalt composition.

15. The method of any of clauses 9-14, wherein the cracking resistance additive comprises at least one of a polyalphaolefin and an alkylated aromatic based on an aromatic having two or more fused aromatic rings and an average alkyl chain length of at least 10 carbons, such as at least 14 carbons, or at least 18 carbons, or at least 24 carbons, or at least 30 carbons.

When numerical lower limits and numerical upper limits are listed herein, ranges from any lower limit to any upper limit are contemplated. While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the present disclosure, including all features which would be treated as equivalents thereof by those skilled in the art to which the disclosure pertains.

The present disclosure has been described above with reference to numerous embodiments and specific examples. Many variations will suggest themselves to those skilled in this art in light of the above detailed description. All such obvious variations are within the full intended scope of the appended claims.

What is claimed is:

1. An asphalt composition, comprising:
    an asphalt having a T10 boiling point of at least 900° F. (482° C.); and
    from 0.25 wt % to 2.0 wt % of a cracking resistance additive, the cracking resistance additive comprising at least one of a polyalphaolefin, an alkylated aromatic based on an aromatic having two or more fused aromatic rings and an average alkyl chain length of at least 10 carbons, or an ester, the boiling point of the cracking resistance additive being at least 140° C., and the melting point of the cracking resistance additive being at least 5° C. less than a low temperature performance grade for the asphalt, the low temperature performance grade being a low temperature performance grade for a paving asphalt.

2. The asphalt composition of claim 1, wherein the cracking resistance additive comprises at least one of a polyalphaolefin or an alkylated aromatic based on an aromatic having two or more fused aromatic rings and an average alkyl chain length of at least 14 carbons.

3. The asphalt composition of claim 2, wherein the alkylated aromatic comprises an alkylated naphthalene.

4. The asphalt composition of claim 1, wherein the average alkyl chain length is at least 18 carbons.

5. The asphalt composition of claim 1, wherein the cracking resistance additive has a pour point that is at least 5° C. less than a low temperature performance grade for the asphalt.

6. The asphalt composition of claim 1, further comprising from 1 wt % to 6 wt % of a styrene butadiene copolymer.

7. The asphalt composition of claim 6, wherein the styrene butadiene copolymer has a glass transition temperature of −50° C. or less and includes 40% or less of 1-2 vinyl linkages.

8. A method for forming an asphalt composition, comprising:
    mixing an asphalt with 0.1 wt % to 5 wt % of cracking resistance additive, the cracking resistance additive comprising at least one of a polyalphaolefin, an alkylated aromatic based on an aromatic having two or more fused aromatic rings and an average alkyl chain length of at least 10 carbons, or an ester, the boiling point of the cracking resistance additive being at least 140° C., and the melting point of the cracking resistance additive being at least 5° C. less than a low temperature performance grade for the asphalt.

9. The method of claim 8, wherein the asphalt comprises an asphalt fraction formed by fractionating a feedstock containing at least a portion derived from a mineral crude oil at a cut point of at least 900° F. (482° C.) to form the asphalt fraction.

10. The method of claim 8, wherein mixing the asphalt comprises mixing the asphalt with the cracking resistance additive at a temperature where the cracking resistance additive and the asphalt form a single phase.

11. The method of claim 8, wherein mixing the asphalt further comprises mixing the asphalt with 1 wt % to 6 wt % of a polymer additive.

12. The method of claim 11, wherein the polymer additive is a styrene butadiene copolymer.

13. The method of claim 11, wherein the styrene butadiene copolymer has a glass transition temperature of −50° C. or less and includes 40% or less of 1-2 vinyl linkages.

14. A method for forming an asphalt composition, comprising:
    fractionating a feedstock containing at least a portion derived from a mineral crude oil at a cut point of at least 900° F. (482° C.) to form a lower boiling fraction and an asphalt fraction; and
    mixing the asphalt fraction during fractionation with at least one of a polymer additive and a cracking resistance additive to form an asphalt composition.

15. The method of claim 14, wherein mixing the asphalt fraction during fractionation comprises mixing the asphalt fraction with the at least one of a polymer additive and a cracking resistance additive prior to the asphalt fraction being removed from a fractionator.

16. The method of claim 14, wherein the polymer additive comprises 1 wt % to 6 wt % of styrene butadiene copolymer.

17. The method of claim 16, wherein the styrene butadiene copolymer has a glass transition temperature of −50° C. or less and includes 40% or less of 1-2 vinyl linkages.

18. The method of claim 14, wherein the cut point for fractionating the feedstock is at least 1100° F. (593° C.).

19. The method of claim 14, wherein the cracking resistance additive comprises at least one of a polyalphaolefin or an alkylated aromatic based on an aromatic having two or more fused aromatic rings and an average alkyl chain length of at least 10 carbons.

* * * * *